United States Patent [19]

Fejes

[11] Patent Number: 4,627,331

[45] Date of Patent: Dec. 9, 1986

[54] ROTARY ACTUATOR HAVING CAST PISTON AND ARCUATE RACK BEARING

[75] Inventor: Julius Fejes, Orrville, Ohio

[73] Assignee: Flo-Tork, Inc., Orrville, Ohio

[21] Appl. No.: 740,017

[22] Filed: May 31, 1985

[51] Int. Cl.[4] .................. F16J 1/10

[52] U.S. Cl. .................. 92/129; 92/136; 92/138

[58] Field of Search .................. 92/136, 138, 129, 139

[56] References Cited

U.S. PATENT DOCUMENTS

| | | | |
|---|---|---|---|
| 786,467 | 4/1905 | Snider | 92/138 |
| 2,168,215 | 8/1939 | Keitel | 92/136 |
| 3,246,581 | 4/1966 | Carr | 92/136 |
| 3,376,895 | 4/1968 | Pray | 92/138 |
| 3,605,409 | 9/1971 | Heese | 92/136 |
| 3,657,967 | 4/1972 | Suzuki | 92/136 |
| 3,680,443 | 8/1972 | Jenvey | 92/136 |
| 4,260,128 | 4/1981 | Tito | 92/136 |
| 4,463,662 | 8/1984 | Okuyama | 92/136 |

FOREIGN PATENT DOCUMENTS

| | | | |
|---|---|---|---|
| 211391 | 7/1984 | German Democratic Rep. | 92/136 |

*Primary Examiner*—Abraham Hershkovitz

*Attorney, Agent, or Firm*—Oldham, Oldham & Weber Co.

[57] ABSTRACT

Rotary actuator of the rack and pinion type. The rotary actuator has a rack with a generally cylindrical outer surface having a recess which receives a rack bearing and an arcuate rack bearing which is received in that recess. The rack bearing has an arcuate, convex outer bearing surface and an arcuate concave inner surface which abuts the rack and the rack has a recessed outer surface which conforms in shape to the inner surface of the rack bearing. The rotary actuator may have two racks as shown. The rotary actuator has a pair of floating pistons associated with each rack.

4 Claims, 4 Drawing Figures

ROTARY ACTUATOR HAVING CAST PISTON AND ARCUATE RACK BEARING

TECHNICAL FIELD

This invention relates to rotary actuators and more particularly to rotary actuators of the rack and pinion type.

A rotary actuator is a fluid-driven unit for translating linear motion into rotary motion. Essentially, the rotary motion is accomplished by applying fluid under pressure to a piston which is inside a cylinder. Movement of the piston drives a linear gear rack, which in turn drives a pinion gear mated to it, imparting rotary motion to the output shaft. The output shaft is mounted between two support bearings and is connected to a load, either directly, through a coupling, or by linkage. Rotary actuators are known to provide economical, energy-efficient power convertors for countless occasions and to permit high speed operation with controlled acceleration and deceleration.

BACKGROUND ART

Various constructions of rack and pinion type rotary actuators are known. Such rotary actuators are available in a wide range of sizes and torque outputs. They may be powered by either air or hydraulic fluid under pressure. Various rack and pinion type rotary actuators of different construction and in a range of sizes are described, for example, in a brochure entitled "FLO-TORK Rotary Actuators", published by FLO-TORK, Inc., Orrville, Ohio, 1984 (20 pages). On page 7 of this brochure is illustrated a two-rack hydraulic rotary actuator having four floating pistons, (one at each end of each rack), two one-piece racks, rack bearings, and a one-piece pinion and output shaft which is driven by the racks. The racks and rack bearings in this rotary actuator have flat surfaces which are in contact with each other, so that a certain amount of sliding contact between each rack and its rack bearing can take place. Such movement results in a certain degree of misalignment of the rack in its cylinder, and can even result in tilting of the pistons.

Other references describing rack and pinion type rotary actuators include, for example, Steiner, U.S. Pat. No. 2,844,128, Meyer et al, U.S. Pat. No. 3,156,160, and Carr, U.S. Pat. Nos. 3,213,760 and 3,246,581.

DISCLOSURE OF INVENTION

It is an object of this invention to provide a rotary actuator of the rack and pinion type in which both the rack and the rack bearing are self-aligning.

It is a further object of this invention to provide a rotary actuator having floating pistons with an improved connection between the pistons and the rack to minimize the cocking of the pistons.

These and other objects will be apparent from the specification.

According to this invention there is provided a rotary actuator having a rack and a rack bearing, the rack bearing having an arcuate bearing surface conforming in curvature to that of the cylinder in which it reciprocates, and a concave inner surface which abuts the rack, and wherein the rack has a recess along the bottom thereof which conforms in shape to the shape of the inner surface of the rack bearing.

BEST MODE FOR CARRYING OUT THE INVENTION

This invention will be described with reference to a preferred embodiment having two racks which drive a single pinion. The invention is equally applicable to rotary actuators having only a single rack.

Figure 1:
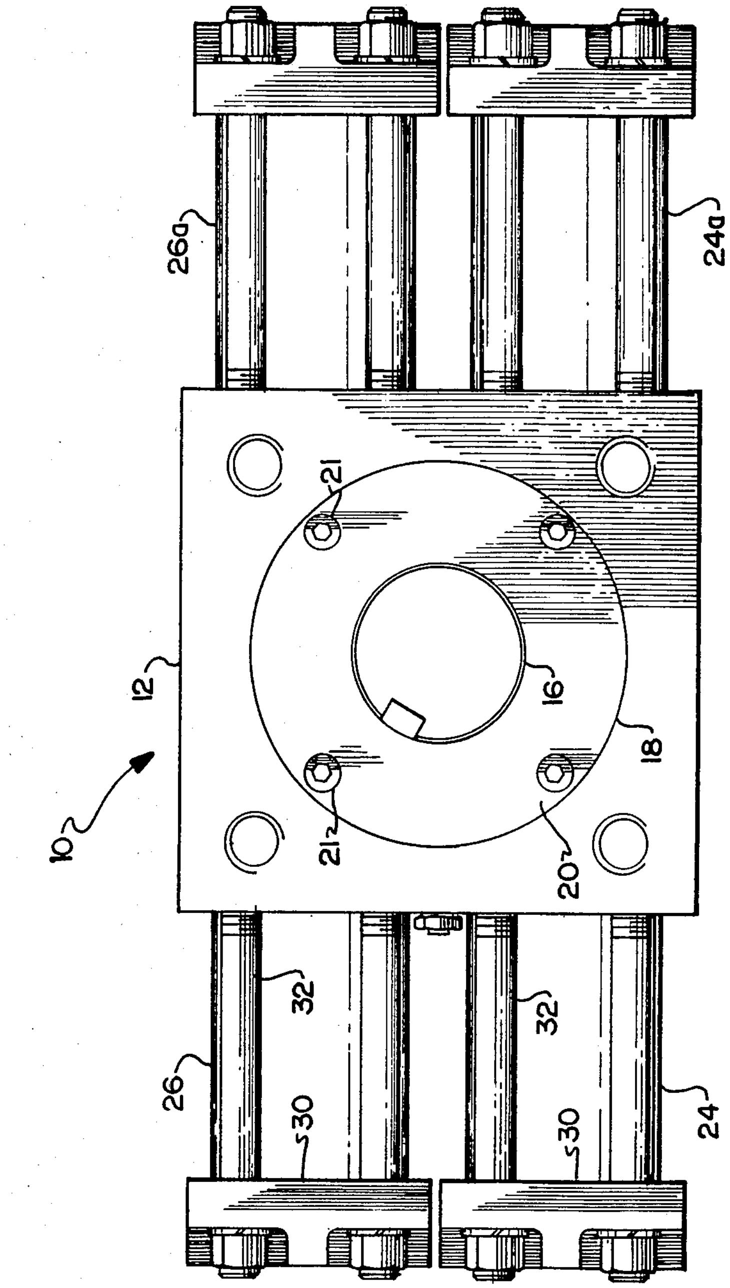
FIG. 1 is a front elevational view of a rotary actuator according to this invention.
Figure 2:
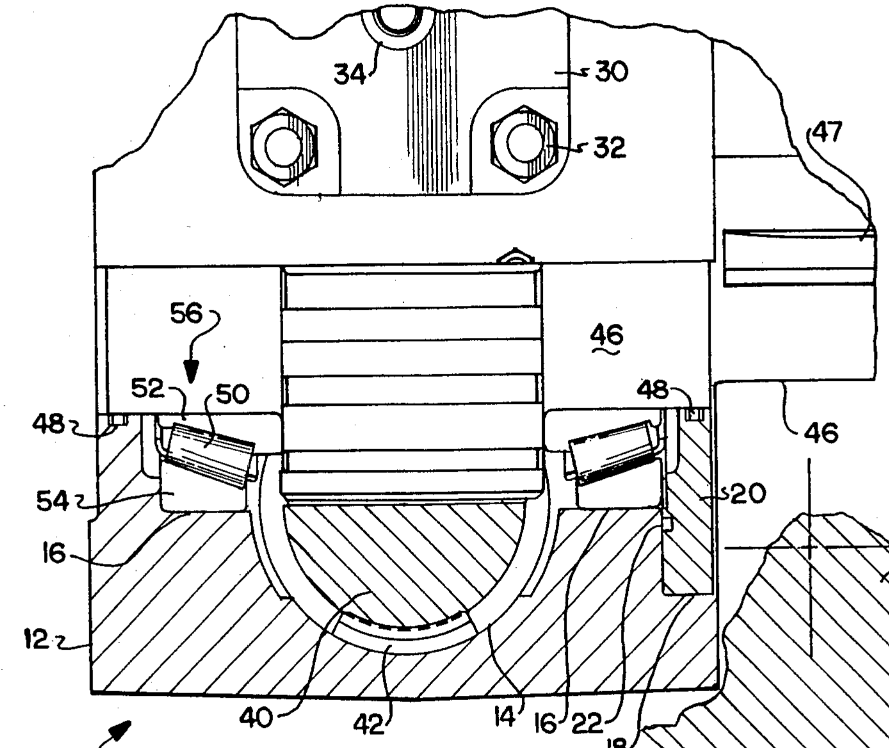
FIG. 2 is a fragmentary side elevational view of a rotary actuator according to this invention, with portions in section along line 2—2 of FIG. 1.

Referring now to FIG. 1, 10 is a rotary actuator according to this invention having a housing 12 in the shape of a rectangular block. As shown in FIG. 2, this housing has two longitudinal bores 14 (one of which is shown) forming rack chambers, a transverse bore 16 forming a pinion chamber, and a transverse counterbore 18 which forms a shoulder for cover plate 20. Bore 16 and counterbore 18 are coaxial. Cover plate 20 provides a closure for the pinion chamber. A central opening in cover plate 20 permits an output shaft 46 to extend therethrough. Cover plate 20 is secured to housing 12 by bolts 21 (FIG. 1). Sealing ring 22 provides a fluid tight seal between cover plate 20 and housing 12.

Two pairs of axially aligned cylinders, 24, *24a*, and 26, *26a* (FIG. 1), extend longitudinally in both directions from housing 12. The inner ends of cylinders 24, *24a* terminate in bore 14 (FIG. 2). Similarly, the inner ends of cylinders 26, *26a* terminate in the second longitudinal bore (not shown). Sealing rings 28 provide a fluid tight seal between housing 12 and the inner end of cylinder 24; each of the other three cylinders is provided with similar sealing rings.

The outer end of each of the cylinders 24, *24a*, 26 and *26a* is closed by an end cap 30. Each end cap 30 has a central opening or port 34 for admission of hydraulic fluid under pressure to its associated cylinder 24, *24a*, 26 or *26a*. Each end cap 30 is secured to the housing 12 by means of tie rods 32.

A floating piston 38 (FIG. 2) is disposed in each cylinder (only one piston is shown in the drawings). Sealing rings 39 provide fluid-tight seals between pistons 38 and the cylinders 24, *24a*, 26, *26a* in which they reciprocate.

Two racks 40 are disposed in housing 12; one of these is connected by a lost motion connection to the pistons 38 in cylinders 24 and *24a*; the other rack (not shown) is connected by a similar lost motion connection to the pistons in cylinders 26 and *26a*. Each rack 40 has a rack bearing 42 associated therewith. The structural arrangement at the interface between each rack 40 and its associated rack bearing 42 is an important feature of this invention and will be described in detail later. Racks 40 drive pinion 44, which in turn drives output shaft 46. Pinion 44 and output shaft 46, which extends through cover plate 20 and outside housing 12 in one direction (although it may extend in both directions if desired), are preferably manufactured as a single piece. Output shaft 46 has keyway 47 to permit connection of a further shaft or linkage; sealing rings 48 provide fluid tight seals between cover plate 20 and shaft 46.

Output shaft 46 is journaled for rotation on roller bearings 50, which roll on bearing races 52, 54. The bearings 50 and bearing races 52,54 are contained in a sealed, lubricant filled bearing assembly 56. This arrangement provides a tight seal for the pinion chamber so that dust and dirt from the outside will not get into the pinion chamber. This makes it possible to use the rotary actuator 10 herein in dusty and dirty environments.

Figure 3:
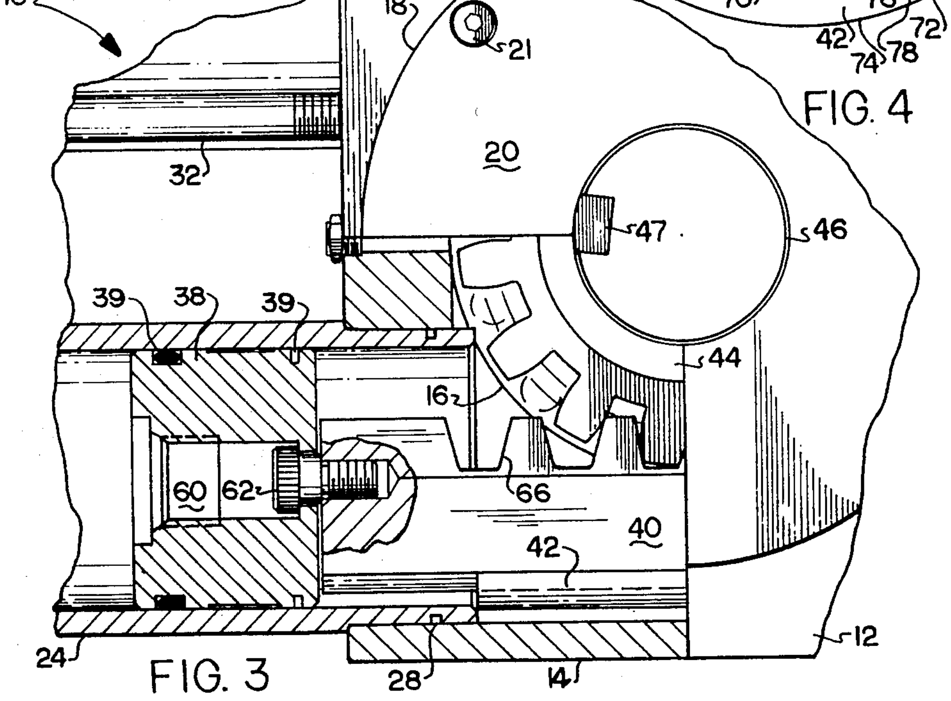
FIG. 3 is an enlarged front elevational view, with parts in section, of a portion of a rotary actuator according to this invention.

The connection between rack 40 and the pistons 38 on either side thereof will now be described with reference to FIG. 3. Referring now to FIG. 3, each piston 38 has a central opening 60 for a shoulder bolt 62. Shoulder bolt 62 secures piston 38 to rack 40 via a lost motion connection which permits piston 38 to float both longitudinally and axially with respect to rack 40. To this end opening 60 comprises a bore of short axial length and a counterbore which together form a shoulder for bolt 62. Bolt 62, includes a head, a collar, and a threaded portion arranged in the order named. The head has a larger diameter than the collar, which in turn is of larger diameter than the threaded portion. The collar of bolt 62 is both longer and narrower than the bore of opening 60, permitting the piston 38 to float both longitudinally and radially with respect to rack 40.

Figure 4:
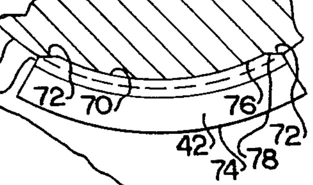
FIG. 4 is a detail drawing showing portions of the rack and rack bearing in section along the interface between these two members.

An important novel feature of the present invention is the arrangement by which a rack 40 and its associated rack bearing 42 are joined together. Referring now to FIGS. 2, 3 and 4, rack 40 has a generally cylindrical body with a row of rack teeth 66 along the top and an arcuate outer surface 68. At the bottom of the body of rack 40 there is a recess for rack bearing 42. Rack bearing 42 and the recess therefor are complementary in shape; both are four-sided with both pairs of opposite sides parallel. In other words, both as viewed are rectangular in shape. This recess is formed by a recessed arcuate outer wall portion 70 and lips 72 on either side thereof. These lips are beveled as may be seen best in FIG. 4. Rack bearing 42 is a generally rectangular curved plate having essentially uniform thickness except near its edges. Rack bearing 42 has a convex arcuate outer bearing surface 74, a curved and preferably arcuate inner surface 76, and beveled portions 78 at the edges of rack bearing 42. The recessed arcute outer surface 70 of rack 40 and the inner surface 76 have the same curvature and are in abutting relationship. Likewise, beveled portions 78 of rack bearing 42 are in abutting relationship with the respective lips 72 of rack 40. The widths of beveled surfaces 72 and 78 have been exaggerated. By providing a rack recess and rack bearing of complementary size and shape with complimentary beveled surfaces, one avoids slippage between the rack and rack bearing and provides a structure which can be easily manufactured at reasonable cost.

Rack bearing 42 and the bearing recess in rack 40 are shorter in length than the length of rack 40. Additionally, the length of rack bearing 42 is less than the axial length of bore 14, and the diameter of bearing surface 74 exceeds the inner diameter of cylinder 24. Preferably cylinder 24, bore 14, curved surfaces 68,70 of rack 40 and the curved surfaces 74,76 of rack bearing 42 are all concentric (the axis of cylinder 24 being the common center) but are of different diameters.

The novel arrangement of rack and rack bearing of this invention offers several advantages. First, sliding movement between the rack and rack bearing is eliminated by providing arcuate interfacial surfaces between the rack and rack bearing instead of flat interfacial surfaces as in the rotary actuator illustrated on page 7 of the FLO-TORK brochure cited supra. Instead, the two move together. This enables the rack bearing 42 to give the rack better support than is the case with previously known rack and rack bearing structures. A further advantage of the novel structure herein is that the rack bearing can be made wider than was the case in previously known rack and rack bearing arrangements such as that shown on page 7 of the FLO-TORK brochure. A wider rack bearing angle of course distributes the weight and separation forces of rack 40 over a wider bearing surface area.

A further characteristic of the rack and rack bearing arrangement herein (also characteristic of that shown on page 7 of the FLO-TORK brochure) is that force from pinion 42 is not transmitted to pistons 38, as the rack and rack bearing can float perpendicular to the bore in which the rack reciprocates.

Pistons 38 are free to float by virtue of the joint between pistons 38 and rack 40, which comprises a single shoulder bolt 62 as shown in FIG. 3. This allows a certain amount of relative movement between rack 40 and pistons 38. The piston 38 and rack 40 do not have to be precisely axially aligned, since the collar of bolt 62 is slightly smaller in diameter than the bore in piston 38. Also, as previously pointed out, there can be a certain amount of relative longitudinal movement or lost motion between the rack and the piston.

Operation of the rotary actuator of this invention will now be described. To cause the pinion 44 and pinion shaft 46 to rotate clockwise, fluid under pressure is admitted simultaneously to the upper left cylinder 26 and the lower right cylinder 24*a* (see FIG. 1). As fluid under pressure is admitted to these two cylinders, fluid at somewhat lower pressure flows out of the two remaining cylinders. Conversely, to cause the pinion 44 and pinion shafts 46 to rotate counterclockwise, fluid under pressure is admitted simultaneously to the lower left cylinder 24 and the upper right cylinder 26*a*, while fluid at lower pressure flows out of upper left cylinder 26 and lower right cylinder 24*a*.

While in accordance with the patent statutes only a preferred embodiment has been illustrated and described in detail, it is to be particularly understood that the invention is not limited thereto or thereby.

What is claimed is:

1. A rotary actuator having (a) a housing having a longitudinally extending bore therein;

(b) a pair of cylinders axially aligned with said bore, the inside diameter of said cylinders being less than the diameter of said bore;

(c) a rack reciprocable in said cylinders;

(d) a pair of floating pistons and means for securing said pistons to said rack at the opposite ends thereof;

(e) a floating rack bearing having an arcuate outer surface conforming to the curvature of said bore, said outer surface being larger in diameter than the inside diameters of said cylinders, and a concave curved inner surface which abuts said rack, (f) said rack having a longitudinally extending recess for said rack bearing, said recess and the inner surface of said rack bearing being complementary in shape, said recess being formed by a recessed curved outer wall portion, said outer wall portion and the inner surface of said rack having the same curvature and width and being in abutting relationship.

2. A rotary actuator according to claim 1, wherein pistons and means, said means for securing said pistons to said rack comprises a single bolt for each of said pistons, said bolt being threadably received in a socket in said rack and being free to move both laterally and longitudinally within defined limits relative to said piston.

3. A rotary actuator according to claim 1 in which said recess and said rack bearing each have a pair of parallel longitudinally extending sides, said rack having beveled lips along the lonitudinally extending edges of said recess, and said rack bearing having correspondingly beveled edges adjacent to its concave inner surface, said beveled lips and beveled edges being in abutting relationship.

4. A rotary actuator according to claim 3 wherein said concave inner surface of said rack bearing is arcuate.

* * * * *